United States Patent Office 3,743,670
Patented July 3, 1973

3,743,670
B-IODOETHYL ESTER OF TRICHLOROACETIC ACID
Henry Martin, Basel, Ernst Beriger, Allschwil, and Ludwig Ebner, Stein, Aargau, Switzerland, assignors to Ciba-Geigy AG, Basel, Switzerland
No Drawing. Continuation of application Ser. No. 647,577, Apr. 1, 1967, now abandoned, which is a division of application Ser. No. 559,363, May 3, 1966, now Patent No. 3,394,168, which in turn is a division of application Ser. No. 256,254, Feb. 5, 1963, now abandoned. This application Sept. 10, 1970, Ser. No. 71,242
Claims priority, application Switzerland, Feb. 15, 1962, 1,850/62
Int. Cl. C07c 69/62
U.S. Cl. 260—487                                   1 Claim

ABSTRACT OF THE DISCLOSURE

Compounds having the general formula:

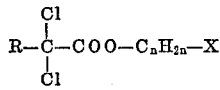

in which R is chlorine, methyl or chloroalkyl of from 1 to 3 carbon atoms, $n$ is an integer ranging from 1 to 4, and X is hydrogen, halogen, alkenyl, alkynyl, alkoxy or —COOA where A represents alkyl; and the compound having the formula

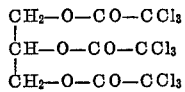

are active herbicidal agents.

CROSS-REFERENCE TO RELATED APPLICATIONS

This is a continuation of application Ser. No. 647,577, filed Apr. 1, 1967, now abandoned, which in turn is a division of application Ser. No. 559,363, filed May 3, 1966, now U.S. Pat. No. 3,394,168. Application Ser. No. 559,363 is itself a division of Ser. No. 256,254, filed Feb. 5, 1963, now abandoned.

DETAILED DISCLOSURE

The present invention provides preparations for controlling undesired plant growth which contain as active principle a compound of the general formula

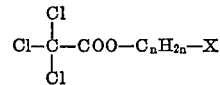 (I)

in which

R represents a chlorine atom, a methyl group or a chloralkyl radical with 1 to 3 carbon atoms, preferably the chloromethyl radical,
$n$ is 1, 2, 3 or 4,
X represents a hydrogen atom, a halogen atom, an alkenyl or alkinyl radical with 1 to 4 carbon atoms (preferably the acetylene radical), an alkoxy group with 1 to 4 carbon atoms, preferably the methoxy radical or the radical —COOA (where A stands for an alkyl radical with 1 to 4 carbon atoms), or which contain as active principle the compound of the formula

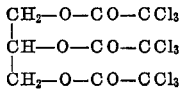 (II)

and if desired, at least one of the following additives: Solvents, diluents, dispersing agents, wetting agents, adhesives, fertilizers and further pest combating agents.

A particularly strong herbicidal action is found in those new preparations which contain as active principle a compound of the general formula $$Cl-\underset{\underset{Cl}{|}}{\overset{\overset{Cl}{|}}{C}}-COO-C_nH_{2n}-X$$

in which X stands for a hydrogen, chlorine or bromine atom, for the methoxy radical or for the acetylene radical, and $n$ is 1, 2, 3 or 4.

As examples of the herbicidal compounds of the general Formulae I and II to be used according to the present invention there may be mentioned above all the following:

TABLE

| | | Boiling point | |
|---|---|---|---|
| | | Temperature, °C. | Pressure, mm. Hg |
| 1 | $CCl_3COOC_2H_4Br$ | 116–119 | 18 |
| 2 | $CH_3\text{-}CCl_2COOC_2H_4Br$ | 109–114 | 19 |
| 3 | $CH_3\text{-}CCl_2COOC_2H_4OCH_3$ | 99–100 | 18 |
| 4 | $CCl_3COOC_2H_4OCH_3$ | 105–106 | 18 |
| 5 | $CH_3\text{-}CCl_2COOC_2H_4Cl$ | 99–101 | 20 |
| 6 | $CCl_3COOCH_2\text{-}COOC_4H_9$ | 140–144 | 10 |
| 7 | $CCl_3COOC_2H_4I$ | 112–120 | 11 |
| 8 | $CCl_3COOCH_2CH_2CH_2\text{---}Cl$ | 97.0–97.7 | 3 |
| 9 | $CCl_3COOC_2H_4Cl$ | 99–100 | 14 |
| 10 | $Cl\text{---}CH_2\text{---}CCl_2\text{---}COOC_2H_4\text{---}Cl$ | 121–126 | 16 |
| 11 | $CCl_3COOCH_2\text{---}C\!\!\equiv\!\!CH$ | 78 | 11 |
| 12 | $CCl_3COOCH_3$ | 48–50 | 13 |
| 13 | $CCl_3COOC_2H_5$ | 68 | 10 |
| 14 | $CCl_3COOC_4H_9$ | 81 | 10 |
| 15 | 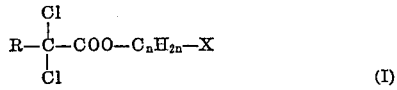 | 68 | 10 |
| 16 | $\begin{array}{l}CH_2\text{---}O\text{---}COCCl_3\\ |\\ CH\text{---}O\text{---}COCCl_3\\ |\\ CH_2\text{---}O\text{---}COCCl_3\end{array}$ | 165 | 0.05 |

The compounds to be used according to the invention are prepared, for example by reacting equimolecular amounts of the selected chlorocarboxylic acid with the appropriate hydroxy compound in the presence of paratoluenesulphonic acid as catalyst, while removing the liberated water azeotropically with the aid of benzene. Instead of chlorocarboxylic acid there may be used one of its reactive derivatives, for example its chloride, as starting materials.

The preparations of the invention are primarily suitable for the selective control of the undesired growth of monocotyledonous plants in cultures of dicotyledonous plants, and in this connection their surprisingly good effect towards couch grass (*Agropyron repens*) may be specially mentioned.

When used at high concentrations or in combination with other herbicides, the preparations of this invention may also be used as total herbicides.

The active principles of the General Formula I may be used by themselves or in conjunction with other (more especially selective) weed killers, also with borax or other inorganic salts, fertilizers or pesticides, for example chlorinated hydrocarbons or phosphoric acid esters.

For the manufacture of solutions of the compounds of the general Formula I for immediate spraying there may be used organic solvents having a boiling point above 100° C., for example petroleum fractions having a medium to high boiling range, that is to say above 100° C., such as diesel oil or kerosene, coal tar oils or oils of vegetable or animal origin, as well as hydrocarbons such as alkylated naphthalene or tetrahydronaphthalene if desired with the use of xylene mixtures, cyclohexanols, ketones or chlorinated hydrocarbons such as tetrachloroethane, trichloroethylene or trichlorobenzenes or tetrachlorobenzenes.

To make preparations in the form of aqueous mixtures it is particularly advantageous to use emulsion concentrates pastes or wettable spray powders and adding water thereto. Suitable emulsifying or dispersing agents are nonionic products, for example condensation products of ethylene oxide with aliphatic alcohols, amines or carboxylic acids containing a long-chain hydrocarbon radical with about 10 to 30 carbon atoms with ethylene oxide such as the condensation product from octadecyl alcohol with 25 to 30 mols of ethylene oxide, or soya bean fatty acid with 30 mols of ethylene oxide, or commercial oleylamine with 15 mols of ethylene oxide, or dodecylmercaptan with 12 mols of ethylene oxide.

As suitable anionic amulsifying agents there may be mentioned:

the sodium salt or dodecyl alcohol sulfuric acid ester,
the sodium salt of dodecyl benzenesulfonic acid,
the potassium or triethanolamine salt of oleic or abietic acid or of mixtures of these acids, or
the sodium salt of a petroleum-sulfonic acid.

Suitable cationic dispersing agents are quaternary ammonium compounds such as cetyl pyridinium bromide or dihydroxyethyl benzyldodecyl ammonium chloride.

For the manufacture of dusting and scattering preparations there may be used as solid vehicles talcum, kaolin, bentonite, calcium carbonate or phosphate, coal, cork meal, wood meal or other materials of vegetable origin. It is very advantageous to manufacture the preparations in the form of granulates. With the different forms in which the preparations are used there may be incorporated the conventional additives that improve the distribution, adhesion, stability towards rain or the penetration, such as fatty acids, resins, glue, casein or alginates.

The invention further includes the new compounds of the general formula

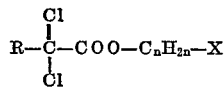

in which R represents a chlorine atom or the methyl or chloromethyl group, and when R is a chlorine atom, X represents an iodine atom, the acetylene radical or the group —COOA (in which A stands for an alkyl radical with 1 to 4 carbon atom) and, when R— —CH$_3$ or —CH$_2$Cl, X may also represent a chlorine or bromine atom, an alkyl radical with 1 to 4 carbon atoms or the methoxy group; and it includes also the manufacture of the compounds referred to above by methods known to be suitable for the manufacture of analogous compounds. More especially the invention relates to compounds of the formula

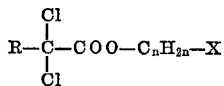

wherein R represents a member selected from the group consisting of the radical —CH$_3$ and the radical —CH$_2$—Cl, and X represents a member selected from the group consisting of a halogen atom, and alkyl radical containing at the most 4 carbon atoms, the methoxy radical, the radical —C≡CH and the radical —COOA, in which A stands for an alkyl radical containing at most 4 carbon atoms; or of the formula

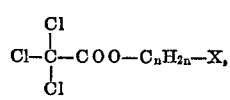

in which X represents a member selected from the group consisting of the iodine atom, the radical —C≡CH and the radical —COOA, wherein A stands for a lower alkyl radical.

EXAMPLE 1

Emulsions are prepared, each containing 50% of one of the compounds (1) to (16) listed in the foregoing table, as well as 5% of an emulsifying agent consisting of a mixture of an alkylphenol polyglycol ether more especially the additive compound from 5 to 20 mols of ethylene oxide with paratertiary octylphenol) and a calcium or magnesium salt of an alkylarylsulfonic acid (more especially mono-lauryl benzenesulfonic acid) and 45% of diesel oil.

The resulting emulsions may be diluted with water in any proportion to form spray broths.

EXAMPLE 2

The following plants are grown from seeds in pots filled with earth in a greenhouse: Zea mays, Avena fatua L., Setaria italica, Dactylis glomerata, Sinapis arvensis, Medicago sativa and Calendula chrysantha.

(a) 2 days after seeding each pot is treated with a spray broth which has been prepared as described in Example 1 and contains 2.5% of the compound (9) shown in the foregoing table; the amount of active principle used corresponds to 25 kg. per hectare. 20 days after the treatment the monocotyledonous plants Zea mays, Avena fatua L., Setaria italica and Dactylis glomerata have died off completely, whereas the dicotyledonous plants Sinapis arvensis, Medicago sativa and Calendula chrysantha display at most only little damage.

(b) A similar result is achieved by spraying the broth concerned about 12 days after seeding, that is to say when the plants have developed their second true leaf.

Comparable selective herbicidal effects are obtained by using in the manner described above under (a) or (b) spray broths which have been prepared according to Example 1 and contain one of the compounds (1) to (8) or (10) to (16) listed in the foregoing table.

EXAMPLE 3

A field which is strongly infested with Agropyron repens (couch grass) is seeded after the spring tilling with the following kinds of plants:

Monocotyledones

Zea mays, Sorghum sudanense, Setaria, Triticum vulgare, Avena sativa, Hordeum distichum, Festurca elatior, Lolium perenne, Allium cepa.

Dicotyledones

Daucus carota, Medicago sativa, Linum usitatissimum, Sinapis arvensis, Raphanus, Beta vulgaris.

2 days after having been seeded the field is treated with a spray broth which has been prepared as described in Example 1 and contains as active principle the compound (9) of the foregoing table, corresponding to an amount of 10 kg. of active principle per hectare. On evaluation 2 months after the treatment it is observed that the field is completely free from Agropyron repens (couch grass); in addition, all aforesaid monocotyledones with the exception of Allium cepa (seed onion) have died off after germination.

Comparable selective herbicidal effects are obtained by using in the aforementioned manner spray broths which have been prepared as described in Example 1 and contain one of the compounds (1) to (8) or (10) to (16) of the foregoing table.

EXAMPLE 4

(a) A winter wheat field strongly infested with couch grass was treated at the end of February, when the couch grass had begun to germinate, with a spray broth which had been prepared as described in Example 1 and contained as active principle the compound (9) of the foregoing table in an amount corresponding to 40 kg. per hectare. A short time before the treatment the wheat and the germinating couch grass were destroyed in one half of the field by means of a rotary hoe with a view to checking a pre-emergence effect in this part of the field. On evaluation 4 months after the treatment it was found that both in the previously hoed part of the field (pre-emergence) and in the part that had not been hoed (post-emergence) *Agropyron repens* (couch grass), *Triticum vulgare* (winter wheat) and *Sinapis arvensis* (charlock) had been completely destroyed.

(b) A field strongly infested with couch grass was treated a short time after seeding it with sugar beets (*Beta vulgaris*) with a spray broth which had been prepared as described in Example 1 and contained as active principle the compound (9) of the foregoing table in an amount corresponding to 30 kg. per hectare. This treatment killed the couch grass off completely, while the sugar beets suffered almost no damage at all.

(c) A field strongly infested with couch grass was treated a short time after seeding it with flax (*Linum usitatissimum*) with a spray broth which had been prepared as described in Example 1 and contained as active principle the compound (9) of the foregoing table in an amount corresponding to 20 kg. per hectare. By this treatment the couch grass was completely destroyed, whereas the flax suffered almost no damage at all.

Comparably favourable herbicidal effects are obtained by using as described above under (a), (b) or (c) spray broths which have been prepared as described in Example 1 and contain one of the compounds (1) to (8) or (10) to (16) shown in the foregoing table.

What is claimed is:
1. A compound of the formula

$$CCl_3-COO-CH_2-CH_2I.$$

References Cited

UNITED STATES PATENTS

| | | | |
|---|---|---|---|
| 3,201,458 | 8/1965 | Scheverer | 260—487 |
| 2,550,049 | 4/1951 | Eaker | 260—487 X |
| 3,600,434 | 8/1971 | Rust et al. | 260—487 |

LORRAINE A. WEINBERGER, Primary Examiner

J. F. TERAPANE, Assistant Examiner

U.S. Cl. X.R.

71—106